United States Patent
Biewald et al.

(10) Patent No.: US 10,402,185 B2
(45) Date of Patent: Sep. 3, 2019

(54) PRECISION LOCKING A DATABASE SERVER DURING THE UPGRADE OF A SYSTEM LANDSCAPE

(71) Applicant: SAP SE, Walldorf (DE)

(72) Inventors: Lars-Eric Biewald, Mannheim (DE); Juergen Specht, Gerabronn (DE); Thomas Ullrich, Stutensee (DE); Steffen Meissner, Heidelberg (DE)

(73) Assignee: SAP SE, Walldorf (DE)

( * ) Notice: Subject to any disclaimer, the term of this patent is extended or adjusted under 35 U.S.C. 154(b) by 937 days.

(21) Appl. No.: 14/852,119

(22) Filed: Sep. 11, 2015

(65) Prior Publication Data

US 2017/0075939 A1 Mar. 16, 2017

(51) Int. Cl.
*G06F 8/65* (2018.01)

(52) U.S. Cl.
CPC .................................... *G06F 8/65* (2013.01)

(58) Field of Classification Search
None
See application file for complete search history.

(56) References Cited

U.S. PATENT DOCUMENTS

| | | | |
|---|---|---|---|
| 9,864,866 B2* | 1/2018 | Pasion | G06F 21/606 |
| 2010/0138440 A1* | 6/2010 | Driesen | G06F 17/30377 |
| | | | 707/765 |
| 2014/0359046 A1* | 12/2014 | Colle | H04L 29/06 |
| | | | 709/213 |

* cited by examiner

*Primary Examiner* — Amresh Singh
(74) *Attorney, Agent, or Firm* — Fountainhead Law Group P.C.

(57) ABSTRACT

Various techniques are described for precisely locking database objects within a database during a system upgrade with the use of database freeze triggers. Some database freeze triggers can be utilized to lock transport requests while other database freeze triggers can be utilized to lock database objects such as exchange tables. For transport requests, techniques describe the use of a whitelist identify transport objects or transport object types which shall remain unblocked. As a result, a database freeze trigger can be generated for transport objects or transport object types that are not included in the whitelist. For database objects, techniques describe the identification of a tool or service which has been allowed during the upgrade. Database objects which can be modified during execution of the tool or service can be identified. Database freeze triggers can be generated for the database objects besides those identified.

20 Claims, 4 Drawing Sheets

PRECISION LOCKING A DATABASE SERVER DURING THE UPGRADE OF A SYSTEM LANDSCAPE

BACKGROUND

Software is typically created in a three-system landscape that includes a DEV system, a QUAL (e.g. test) system, and a PROD system. Software configuration changes are first made in the DEV system and then loaded to the QUAL system where the configuration can be tested. Once tested, the configuration can then be loaded into the PROD system for use by customers in a live setting. As new versions of the software are created, each system within the landscape is sequentially upgraded to the new version.

During the upgrade procedure of a system, changes to the system can be restricted to maintain persistency in the data. This is because changes made to a system while the system is in the middle of an upgrade procedure are sometimes not migrated over to the upgraded system. This can result in data loss, data corruption, or unexpected behavior. To restrict changes from being made during an upgrade, the system is locked. The lock creates a period of downtime where customization and development of the system is blocked as users are unable to make changes to the system. During these locked periods (which can last days to weeks), the customer either takes time off or continues development in a duplicated system. Both options are undesirable to the customer since they slow down or complicate business processes. Thus, minimizing the effects of the downtime is highly desirable to improve productivity.

SUMMARY

In one embodiment, a computer-implemented method initiates, by a processor, an upgrade of a system within a system landscape. The method then generates, by the processor, a plurality of database freeze triggers configured to prevent modification of a plurality of data objects within a database of the system while the upgrade is being performed. The method then first determines, by the processor, a tool or application of the system that has been enabled to operate while the upgrade is being performed. The method then identifies, by the processor, a database object from the plurality of database objects that is modifiable by the enabled tool or application. The method then deletes, by the processor, a database freeze trigger corresponding to the database object to allow changes to be made to the database object while the upgrade is being performed.

In one example, method further receives, by the processor, a transport request to transport content from the system to another system, the content having a transport object type and second determines, by the processor, whether the transport object type is within a whitelist containing a plurality of transport object types that are transportable between the system and the another system while the upgrade is being performed. The method can further execute, by the processor, the transport request in response to the second determination while the upgrade is being performed. Alternatively, the method can further block, by the processor, the execution of the transport request in response to the second determination and store, by the processor, the transport request in an import buffer of the another system in response to the second determination while the update is being performed. The method can further import, by the processor, transport requests in the import buffer to the another system after the upgrade has been completed.

In another example, the data object is an exchange table configured to store data dictionary objects.

In another example, the database freeze trigger is generated with SQL Templates.

In another embodiment, a non-transitory computer readable storage medium stores one or more programs comprising instructions for initiating an upgrade of a system within a system landscape, generating a plurality of database freeze triggers configured to prevent modification of a plurality of data objects within a database of the system while the upgrade is being performed, first determining a tool or application of the system that has been enabled to operate while the upgrade is being performed, identifying a database object from the plurality of database objects that is modifiable by the enabled tool or application, and deleting a database freeze trigger corresponding to the database object to allow changes to be made to the database object while the upgrade is being performed.

In another embodiment, a computer implemented system comprises one or more computer processors memory; and one or more programs. The one or more programs are stored in the memory and configured to be executed by the one or more processors. The one or more programs include instructions for: initiating an upgrade of a system within a system landscape, generating a plurality of database freeze triggers configured to prevent modification of a plurality of data objects within a database of the system while the upgrade is being performed, first determining a tool or application of the system that has been enabled to operate while the upgrade is being performed, identifying a database object from the plurality of database objects that is modifiable by the enabled tool or application, and deleting a database freeze trigger corresponding to the database object to allow changes to be made to the database object while the upgrade is being performed.

The following detailed description and accompanying drawings provide a better understanding of the nature and advantages of the present disclosure.

DETAILED DESCRIPTION

Described herein are techniques for upgrading a system within a landscape in a precisely controlled manner. A landscape consists of multiple systems which provide different environments used during an application's lifecycle. As improvements are made to the application, each system can be upgraded to incorporate the changes. Traditionally, a system goes through a period of downtime while the upgrade is being performed. During the period of downtime, the server can lock database objects and the tools/services which modify the database objects to prevent users from making edits while the upgrade is being performed. This protects the persistency of the data during the upgrade. However, the downtime results in lost productivity. Techniques described herein aim at reducing the loss in productivity by minimizing the tools, services, and objects which are locked while the upgrade is being performed. In some embodiments, the database can control access to the database objects through the user of database freeze triggers rather than having the server control the database locks.

The apparatuses, methods, and techniques described below may be implemented as a computer program (software) executing on one or more computers. The computer program may further be stored on a non-transitory computer readable medium, such as a memory or disk, for example. A computer readable medium may include instructions for performing the processes described below. In the following description, for purposes of explanation, numerous examples and specific details are set forth in order to provide a thorough understanding of various aspects of the present disclosure. It will be evident, however, to one skilled in the art that embodiments of the present disclosure as defined by the claims may include some or all of the features in these examples alone or in combination with other features described below, and may further include modifications and equivalents of the features and concepts described herein.

Figure 1:
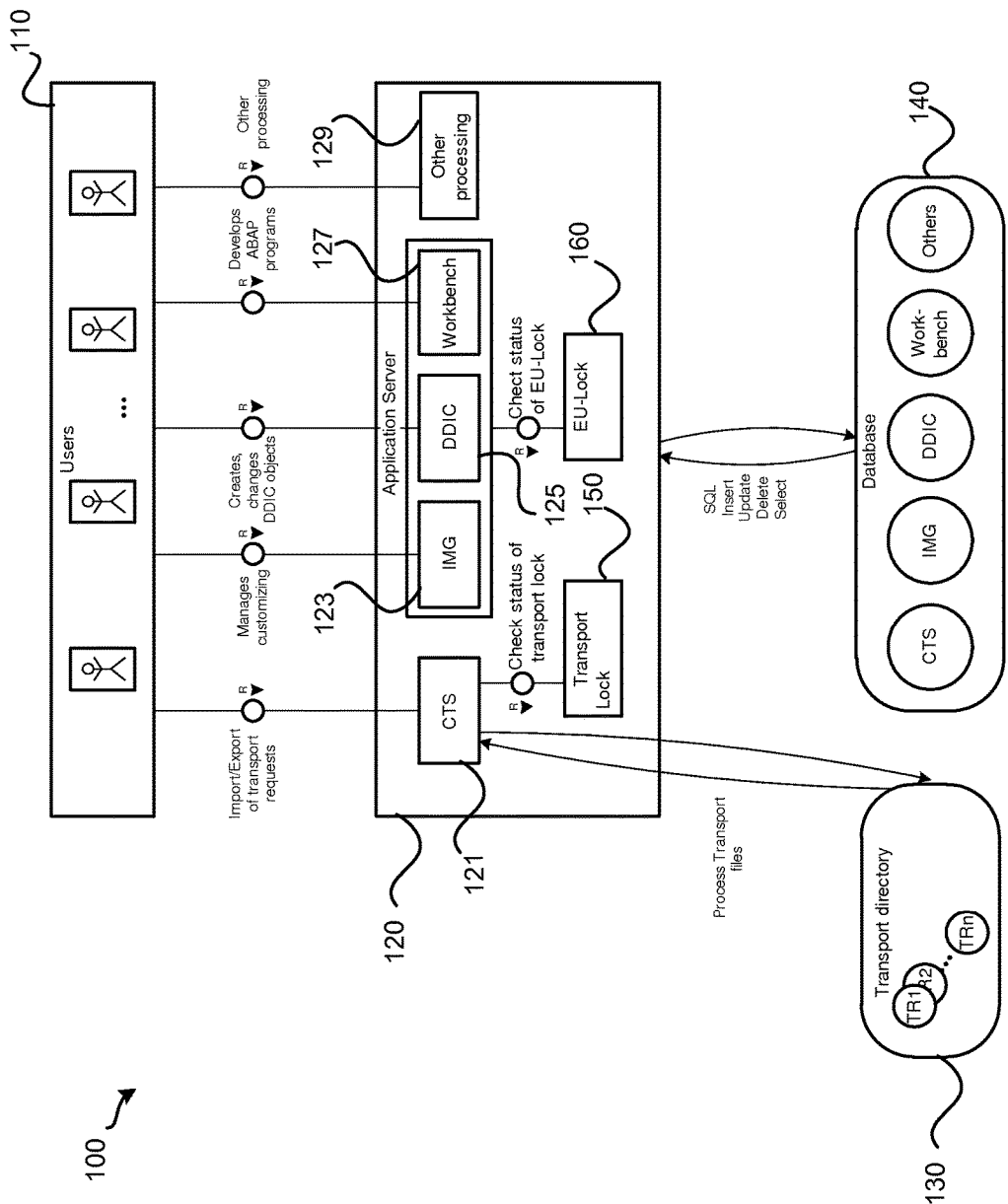
FIG. 1 illustrates a system for locking tools, services, and data within a system during an upgrade according to one embodiment.

FIG. 1 illustrates a system for locking tools, services, and data within a system during an upgrade according to one embodiment. System 100 includes users 110, application server 120, transport directory 130, and database 140. Users 110 can transmit requests to application server 120. Different types of request can be handled by different components within application server 120. Application server 120 includes change and transport system (CTS 121) configured to process transport requests to transport content from one system in the landscape to another system in the landscape. For example, a user in the DEV system can generate a transport request to migrate a change in content from the DEV system into the QUAL system. For example, the change in content can be a change to a report or a database table. The change can also be subsequently migrated from the QUAL system into the PROD system. CTS 121 can process transport requests and store the transport requests within transport directory 130. Transport directory 130 acts as a container to store changes (e.g., data logs, files, and variables) so that the change can be transferred or migrated from one system to another. For example, a DEV system can export changes into the transport directory 130 as a transport request. The QUAL system and PROD system can subsequently import the changes from the transport directory by analyzing the stored transport request.

Application server 120 further includes implementation guide (IMG 123). IMG 123 is a tool which is used to adjust the configuration of system 100. System requirements can be adjusted through IMG 123. As shown, requests to manage customization from users 110 can be routed by application server 120 to IMG 123 for processing.

Application server 120 further includes data dictionary (DDIC 125). DDIC 125 is a tool configured to describe and manage the data definitions used within system 100. For example, DDIC 125 can define the structure of database objects such as tables, indexes, and views, types, domains, search helps, and lock objects. DDIC can also support the definition of user-defined types.

Application server 120 further includes workbench 127. Workbench 127 is a collection of tools used to develop, test, and run application programs. Users 110 can communicate with workbench 127 to create application programs which can be executed within application server 120. In some embodiments, application server 120 can also include other components to support other processing. These are captured in other processing engine 129.

Each component within application server 120 can communicate with database 140 when inserting, updating, deleting, or selecting content stored within database 140. Database 140 includes CTS data which is utilized by CTS 121, IMG data which is utilized by IMG 123, DDIC data which is utilized by DDIC 125, workbench data which is utilized by workbench 127, and other data which is utilized by other processing 129.

System 100 can be periodically upgraded to fix bugs, add functionality, and otherwise improve the system. The landscape which system 100 belongs to can have an upgrade strategy to perform the upgrade. In one embodiment, the upgrade strategy includes application server 120 entering a restricted mode at some point during the upgrade. While in the restricted mode, application server 123 blocks user requests. This ensures that data within database 140 remains persistent before and after the upgrade. Here, application server 120 includes transport lock 150 and EU-lock 160. Transport lock 150 is configured to control the CTS 121's access to CTS data within database 140. When transport lock 150 is set, CTS 121 is unable to transmit transport requests to database 140. As a result, a transport request can be returned to the user with an error. In contrast, CTS 121 is able to access data within database 140 when the transport lock is released. EU-lock 160 is configured to control IMG 123, DDIC 125, and/or workbench 127's access to data within database 140. When EU-lock 160 is set, IMG 123, DDIC 125, and workbench 127 may be unable to access the IMG data, DDIC data, and workbench data within database 140.

When application server 120 receives an import/export transport request, the transport request gets routed to CTS 121. CTS 121 can check the status of transport lock 150. If transport lock 150 is set, then CTS 121 is unable to complete the transport request. Alternatively if transport lock 150 is released, then CTS 121 performs the transport request by generating a SQL statement and transmitting the SQL statement to database 140. Database 140 in turn processes the SQL statement and returns the requested content. The transport request can be stored within transport repository 130 Similarly, IMG 123, DDIC 125, and workbench 127 can check the status of EU-lock 160 prior to performing a user request. Requests to configure system 100, create/change DDIC objects, or develop application programs are rejected when EU-lock 160 is set and accepted when EU-lock 160 is released. Thus, application server 120 utilized transport lock 150 and EU-lock 160 to control access to database 140 during the upgrade.

Figure 2:
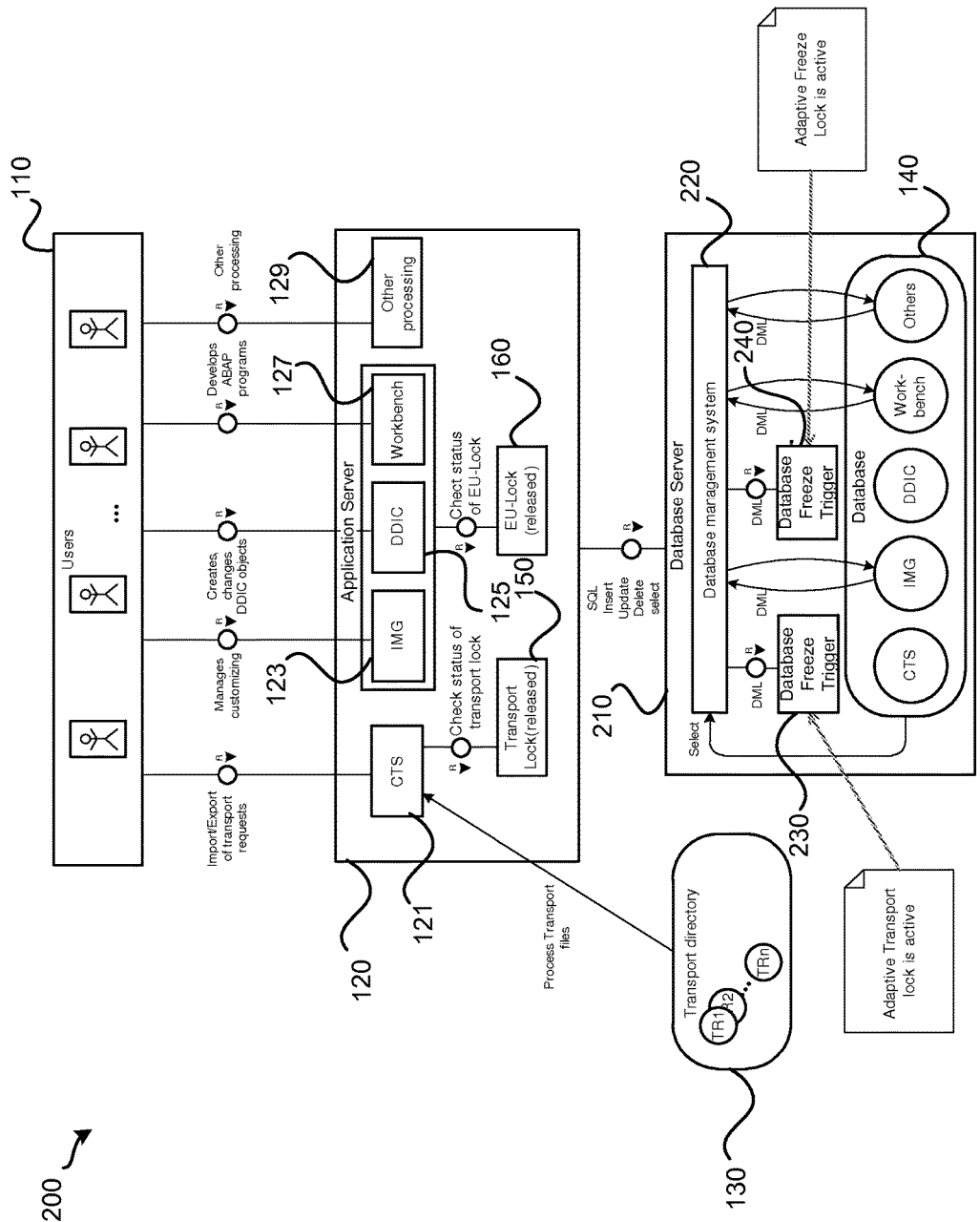
FIG. 2 illustrates a system for precision locking tools, services, and data within a system during an update according to one embodiment.

FIG. 2 illustrates a system for precision locking tools, services, and data within a system during an update according to one embodiment. Similar to system 100, system 200 includes users 100, application server 120, transport director 130, and database 140. Application server 120 includes CTS 121, IMG 123, DDIC 125, workbench 127, other processing 129, transport lock 150, and EU-lock 160.

In contrast to system 100 of FIG. 1 where the locking of database 140 is controlled by application server 120 through the user of transport lock 150 and EU-lock 160, system 200 of FIG. 2 has database server 210 which controls the locking of database 140 through database freeze triggers. Here, database server 210 includes database freeze trigger 230 and database freeze trigger 240. Database freeze triggers are a type of database trigger generated in the database level which prevents modification to specified database objects. For example, database freeze trigger 230 can prevent the retrieval or the modification of an exchange table associated with a CTS database object within database 140. Similarly, database freeze trigger 240 can prevent the retrieval or modification of an exchange table associated with a DDIC database object within database 140. In essence the database freeze triggers are capable of controlling access to a particular database object while transport lock 150 and EU-lock 160 are capable of controlling access to a collection of database objects.

System 200 can include database server 210. Database server 210 is configured to generate database freeze triggers and to control access to database 140 through the use of database freeze triggers. Database server 210 includes database management system (DMS 220) which can process SQL statements received from application server 120. The SQL statements can be requests to insert, update, delete, or select data within database 140. While processing SQL statements, database management system 220 can check whether any events trigger database freeze triggers. If the processing of a SQL statement leads to the triggering of a database freeze trigger, DMS 220 can execute the procedural code that is associated with the corresponding database freeze trigger.

Each database freeze trigger can contain procedural code that is automatically executed in response to a particular event. The particular event can be triggered based on activity within database 140. For example, an event can be the detection of a request to access certain database objects within database 140. Upon execution, the database freeze trigger can prevent access to database 140. This allows the database freeze trigger to maintain the integrity of the information within database 140 by preventing certain transport object types or database objects within database 140 from being modified. Described below are two types of database freeze triggers—a first database freeze trigger to be used to replace transport lock 150 and a second database freeze trigger to be used to replace EU-lock 160.

Here, database freeze trigger 230 is configured as an adaptive transport lock to prevent access to CTS data within database 140. The CTS data can store transport objects which are used to import and export content between systems. Each transport object can have a transport object type. In one embodiment, database triggers can be configured to prevent access to transport objects having a particular transport object type. Thus, database freeze trigger 230 can be triggered when it detects the event, where the event is an attempt to access a transport object having the particular transport object type. Thus, the database freeze trigger can disable export and import transport requests for transport objects having the particular transport object type.

As an example, users 110 transmit requests to application server 120. One of these requests can be a transport request. Application server 120 processes the transport request which results in the generation of a SQL statement (i.e., database requests) to insert, update, delete, or select a transport object within database 140. Application server 120 can transmit the SQL statement to database server 210 where DMS 220 can execute the SQL statement. During, execution of the SQL statement, database freeze trigger 230 can be triggered when it is detected that the transport object is a particular transport object type that is specified as a triggering event for database freeze trigger 230. Upon detecting the triggering event, database freeze trigger 230 can execute its associated procedural code to prevent inserting, updating, deleting, or selecting of the transport object within database 140, thus disabling the import/export of content specified in the transport request.

Transport requests which were blocked during the upgrade procedure may need to be reimported. To execute transport requests which are blocked during the upgrade procedure, database server 210 can store a history of the transport requests received during the upgrade procedure. The transport requests can be stored in a transport request list that tracks the exports/imports of transit requests and their sequence during the upgrade timeframe. DMS 220 can detect a first transport request in the transport request list that is not in the whitelist. The first transport request not in the whitelist is the first transport request that was blocked. When the first transport request is identified, all other transport requests which follow the first transport request and then copied into a table to create an import buffer for later reimport after the upgrade procedure is completed. The import buffer can be shared with the other systems in the landscape.

In one example, the exchange tables within database 140 can be exchanged with exchange tables in a shadow system. A shadow system can contain one or more exchange tables which are going to be upgraded. The shadow system can include a kernel and a database schema which will be used by the kernel. During the setup of the shadow system, the identified exchange tables are cloned. These exchange tables are a subset of the exchange tables blocked by the EU-Lock and represent the minimal set of exchange tables for running a shadow system. The shadow system can perform upgrades on the exchange tables within the shadow system. After the upgrade has been performed, the exchange tables within the shadow system can be exchanged with the exchange tables in the original system to complete the upgrade. Once the exchange has occurred, the transport requests which were blocked during the upgrade can be performed via the import buffer.

In one embodiment, the database freeze triggers which control the transport objects can be set based on a whitelist. The whitelist can include a listing of transport objects or transport object types. DMS 220 or other component within system 200 can generate the database freeze triggers according to the whitelist. For example, a database freeze trigger can be generated for each transport object that is not within the whitelist. In one embodiment, the database freeze triggers can be generated through the use of SQL Templates. SQL Templates provide a simple way to create complex database objects such as database freeze triggers for all supported database platforms.

In another embodiment, database triggers can be configured to prevent access to other data such as exchange tables within database 140. For example, database trigger 240 can be configured to prevent access to an exchange table within database 140. Here, the exchange table can be associated with a data dictionary object within database 140. In one example, a database freeze trigger can check a primary key of the exchange table to determine if a change is allowed. If the change is not allowed, then the database freeze trigger can generate an error. Tools and applications which do not access locked exchange tables are able to remain operational within system 200. In one embodiment, database server 210 can identify tools and/or applications to remain operational during the upgrade. Through analyzing the persistency of the enabled tools and applications, DMS 220 can identify a plurality of exchange tables which store data that is used by the enabled tools and applications. Once the exchange tables have been identified, DMS 220 can generate database freeze triggers for all the exchange tables other than the identified plurality of exchange tables. This allows the plurality of exchange tables to still remain accessible during the upgrade while other exchange tables are inaccessible due to the database freeze triggers. Exchange tables which are frozen can be upgraded in the shadow system and later switched into the original system.

There are certain advantages to using database freeze triggers versus EU-lock 160. First off, database freeze triggers allow one to precisely control what content within the database is locked during the upgrade. For example, a first exchange table from data dictionary data can be locked during an upgrade while a second exchange table from data dictionary data remains unlocked during the upgrade. In contrast, EU-lock 160 locks applications or programs within application server 120 from accessing particular types of data within database 140. For example, EU-lock 160 can lock both DDIC data and IMG data during an upgrade. If IMG data is not affected by the upgrade, then the IMG data is unnecessarily locked. Similarly if portions of the DDIC data are affected by the upgrade while others are not, then unaffected DDIC data is unnecessarily unlocked. Secondly, database freeze triggers are generated on the database level (within the database server 210) instead of the application level (within application server 120). As a result, the tools and applications within the application server can remain impervious of how data is being locked or unlocked during the upgrade. This allows developers to generate programs without being concerned of details on the upgrade.

Figure 3:
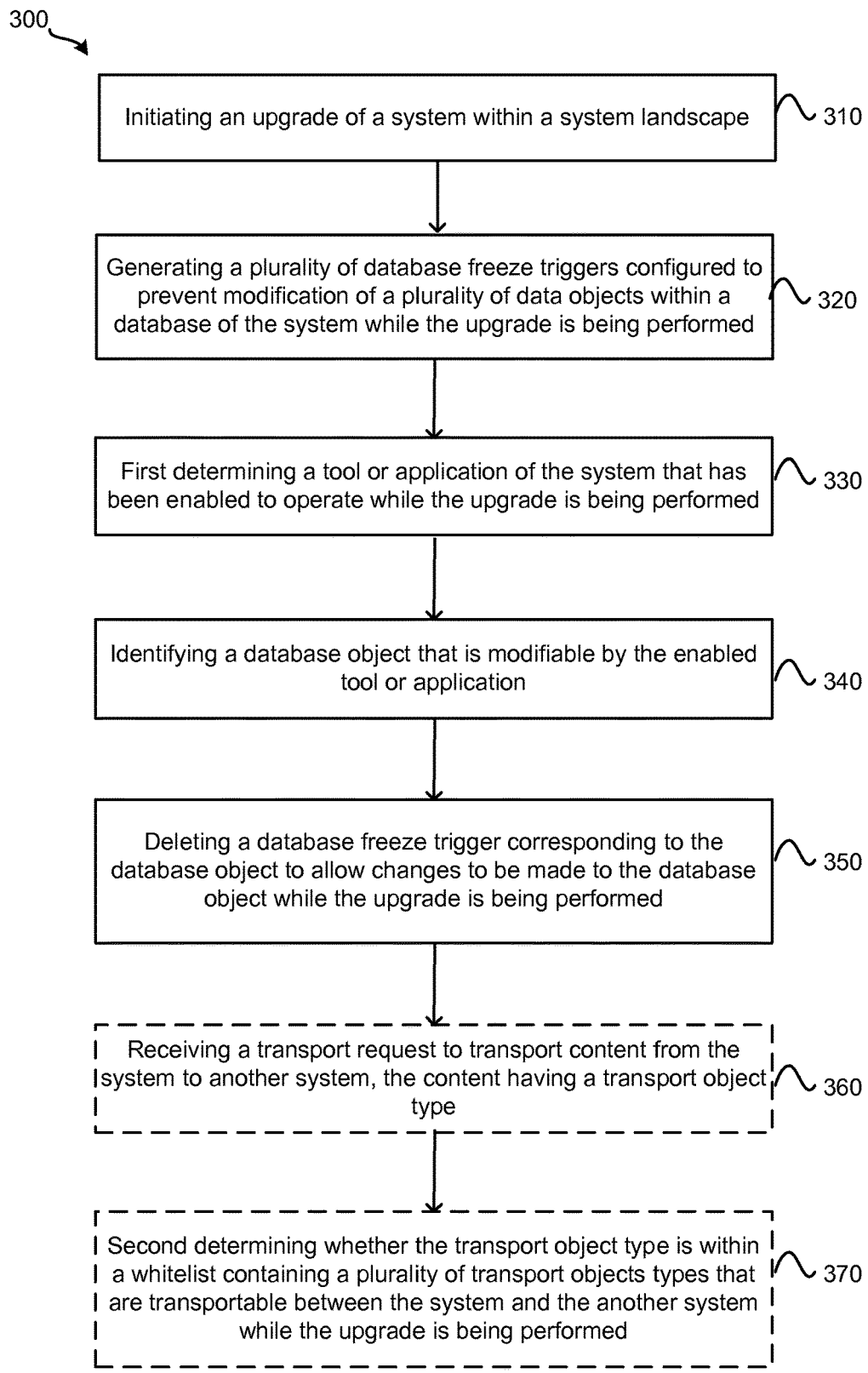
FIG. 3 is an example flow chart illustrating a process for configuring database freeze triggers to control access to a database while an upgrade is being performed in according to one embodiment.

FIG. 3 is an example flow chart illustrating a process for configuring database freeze triggers to control access to a database while an upgrade is being performed in according to one embodiment. Process 300 can implemented within a computer system to configure database freeze triggers. In one embodiment, the computer system is equipped with one or more processors and memory storing one or more programs for execution by the one or more processors. One processor can be implemented as database server 210 or DMS 220 shown in FIG. 2. Process 300 begins by initiating an upgrade of a system within a system landscape at step 610. The upgrade can be initiated after receiving an upgrade request from the user.

After initiating the upgrade, process 300 can continue by generating a plurality of freeze triggers to prevent modification of a plurality of database objects within a database of the system while the upgrade is being performed at 320. The plurality of freeze triggers can be generated using SQL templates. In one embodiment, a database freeze trigger can be generated for each database object within a class of database objects. In one example, a database freeze trigger can be generated for each data dictionary database object. The database objects can include exchange tables. In another example, a database freeze trigger can be generated for each data dictionary database object type.

After generating the plurality of freeze triggers, process 300 can continue by first determining a tool or application of the system that has been enabled to operate while the upgrade is being performed at 330. The tool or application can be specified by the user or be predefined.

After determining the enabled tool or application, process 300 can identify a database object that is modifiable by the enabled tool or application. The one or more database objects which are modifiable by the enabled tool or application can be identified by checking the persistency of the enabled tool or application. For example, logs can be generated during execution of the tool or application to determine the database objects which are accessed or modified during the execution of the tool or application. The logs can be analyzed to map a tool or application to a list of database objects which are associated with the tool or application. The mapping can in turn be utilized by process 300 to identify database objects that are modifiable by a particular tool or application.

After identifying the database object (or database objects), process 300 can delete a database freeze trigger corresponding to the database object to allow changes to be made to the database object while the upgrade is being performed at 340. For transport requests, process 300 can continue by optionally receiving a transport request to transport content from the system to another system at 350. The content can have a transport object type. After receiving the transport request, process 300 can optionally second determine whether the transport object is within a whitelist containing a plurality of transport object types that are transportable between the system and the another system while the upgrade is being performed at 360. In one example, the determination is made by comparing the contents of the whitelist to see whether the transport object type is within the whitelist. If the transport object type is within the whitelist, then process 300 can continue by executing the transport request. Alternatively if the transport request is not within the whitelist, then process 300 can continue by blocking the transport request and storing the transport request in an import buffer. The import buffer can belong to the other system and be executed once the upgrade has been completed.

Figure 4:
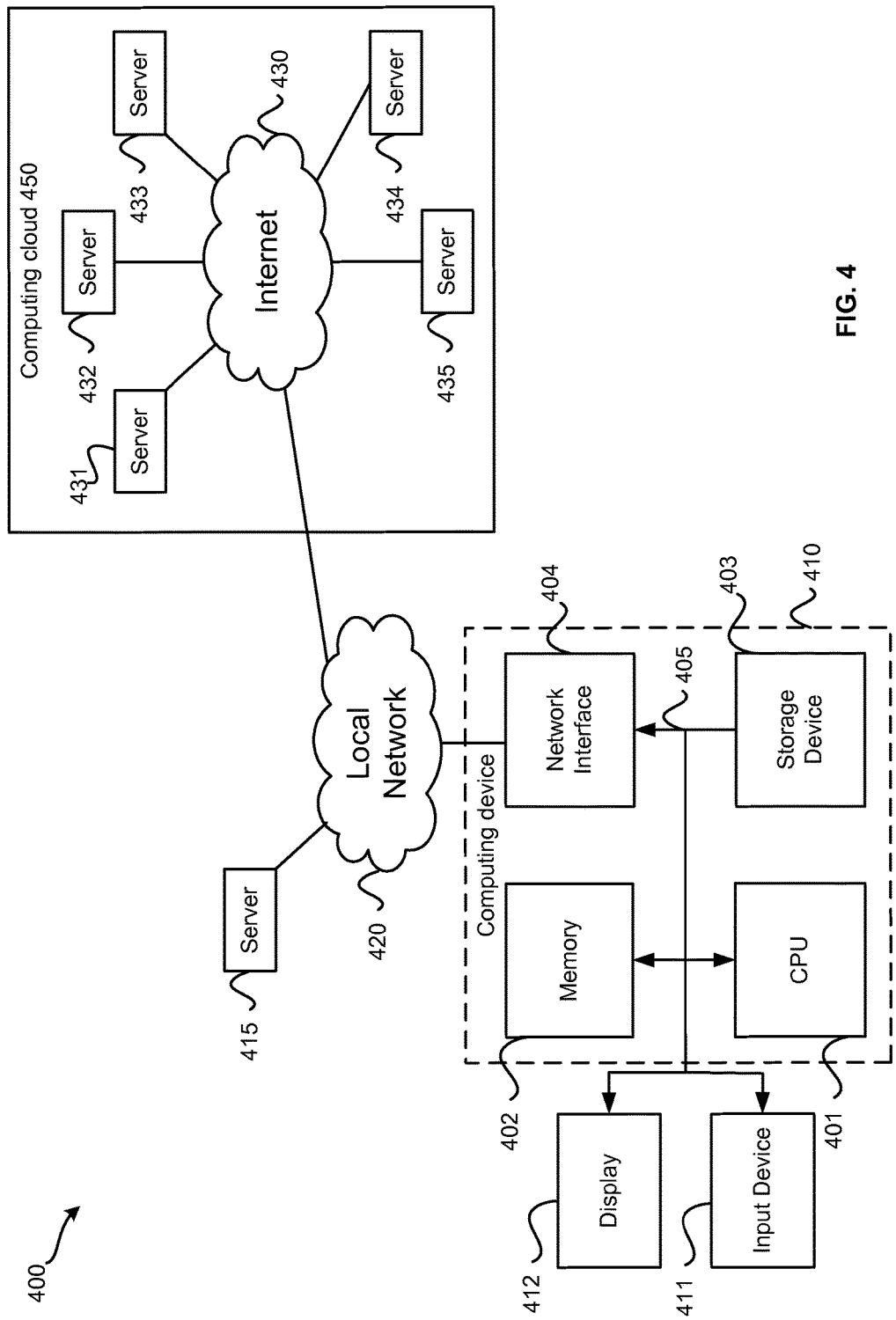
FIG. 4 is an example block diagram illustrating an example computing system in accordance with one embodiment.

FIG. 4 is an example block diagram illustrating an example computing system in accordance with one embodiment. As shown in FIG. 4, in one embodiment, the computing system 410 includes a bus 406 or other communication mechanism for communicating information, and a processor 401 coupled with the bus 405 for processing information. In one embodiment, the computing system 410 also includes a memory 402 coupled to bus 406 for storing information and instructions to be executed by processor 401, including information and instructions for performing the techniques described above, for example. In one embodiment, the memory 402 may also be used for storing variables or other intermediate information during execution of instructions to be executed by processor 401. In one embodiment, the memory 402 includes, but is not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In one embodiment, the storage device 403 may include source code, binary code, or software files for performing the techniques above, for example. The storage device 403 and the memory 402 are both examples of computer readable mediums.

In one embodiment, the computing system 410 may be coupled via the bus 406 to a display 412, such as a cathode ray tube (CRT) or liquid crystal display (LCD), for displaying information to a user. An input device 411 such as a keyboard and/or mouse is coupled to the bus 405 for communicating information and command selections from the user to the processor 401. The combination of these components allows the user to communicate with the computing system 410. In some systems, the bus 406 may be divided into multiple specialized buses.

In one embodiment, the computing system 410 includes a network interface 404 coupled with the bus 405. In one embodiment, the network interface 404 provides two-way data communications between the computing system 410 and the local network 420. In one embodiment, the network interface 407 includes a digital subscriber line (DSL) or a modem to provide data communication connection over a telephone line, for example. Another example of the network interface 404 is a local area network (LAN) card to provide a data communication connection to a compatible LAN. Wireless links are another example. In any such implementation, the network interface 404 sends and receives electrical, electromagnetic, or optical signals that carry digital data streams representing various types of information.

In one embodiment, the computing system 410 sends and receives information, including messages or other interface actions, through the network interface 404 across a local network 420, an Intranet, or the Internet 430. In one embodiment, the local network, the computing system 410 communicates with a plurality of other computer machines, such as a server 415 or a computing cloud 450. In one embodiment, the computing system 410 and server computer systems represented by the server 415 form a cloud computing network, which may be programmed with processes described herein. In the Internet example, software components or services may reside on multiple different computing systems 410 or servers 431-435 across the network. In one embodiment, the processes described above are implemented at computing cloud 450, which includes one or more servers from the servers 431-435. In one embodiment, the server 431 transmits actions or messages from one component, through the Internet 430, the local network 420, and the network interface 404 to a component of the computing system 410. In one embodiment, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first request could be termed a second request, and, similarly, a second request could be termed a first request, without changing the meaning of the description, so long as all occurrences of the "first request" are renamed consistently and all occurrences of the "second request" are renamed consistently. The first request and the second request are both requests, but they are not the request.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method comprising:
    initiating, by a processor, an upgrade of a system within a system landscape;
    generating, by the processor, a first database freeze trigger configured to prevent modification of a first data object within a database of the system in response to a first event occurring within the database while the upgrade is being performed and a second database freeze trigger configured to prevent modification of a second data object within the database of the system in response to a second event occurring within the database while the upgrade is being performed;
    first determining, by the processor, a tool or application of the system that has been enabled to operate while the upgrade is being performed;
    identifying, by the processor, the first database object as modifiable by the enabled tool or application;
    deleting, by the processor, the first database freeze trigger corresponding to the first database object;

while the upgrade is being performed:
  allowing the tool or application to modify the first database object upon detecting the occurrence of the first event, and
  executing the second database freeze trigger in order to prevent the tool or application to modify the second database object upon detecting the occurrence of the second event;
receiving, by the processor, a transport request to transport content from the system to another system, the content having a transport object type;
second determining, by the processor, whether the transport object type is within a whitelist containing a plurality of transport object types that are transportable between the system and the another system while the upgrade is being performed;
blocking, by the processor, the execution of the transport request in response to the second determination; and
storing, by the processor, the transport request in an import buffer of the another system in response to the second determination.

2. The computer-implemented method of claim 1 further comprising executing, by the processor, the transport request in response to the second determination while the upgrade is being performed.

3. The computer-implemented method of claim 1 further comprising importing, by the processor, transport requests in the import buffer to the another system after the upgrade has been completed.

4. The computer-implemented method of claim 1, wherein the first data object is an exchange table configured to store data dictionary objects.

5. The computer-implemented method of claim 1, wherein the database freeze trigger is generated with SQL Templates.

6. The computer-implemented method of claim 1, wherein the first data object is an exchange table configured to store data dictionary objects.

7. The computer-implemented method of claim 1, wherein while the upgrade is being performed:
  receiving from the tool or application a first request to modify the first database object
  receiving from the tool or application a second request to modify the second database object.

8. The computer-implemented method of claim 1 further comprising executing the transport request stored in the import buffer once the upgrade is completed.

9. A non-transitory computer readable storage medium storing one or more programs, the one or more programs comprising instructions, which when executed by a processor, cause the processor to execute a method of:
  initiating an upgrade of a system within a system landscape;
  generating a first database freeze trigger configured to prevent modification of a first data object within a database of the system in response to a first event occurring within the database while the upgrade is being performed and a second database freeze trigger configured to prevent modification of a second data object within the database of the system in response to a second event occurring within the database while the upgrade is being performed;
  first determining a tool or application of the system that has been enabled to operate while the upgrade is being performed;
  identifying the first database object as modifiable by the enabled tool or application;
  deleting the first database freeze trigger corresponding to the first database object;
  while the upgrade is being performed:
    allowing the tool or application to modify the first database object upon detecting the occurrence of the first event within the database, and
    executing the second database freeze trigger in order to prevent the tool or application to modify the second database object upon detecting the occurrence of the second event within the database;
  receiving a transport request to transport content from the system to another system, the content having a transport object type;
  second determining whether the transport object type is within a whitelist containing a plurality of transport object types that are transportable between the system and the another system while the upgrade is being performed;
  blocking the execution of the transport request in response to the second determination; and
  storing the transport request in an import buffer of the another system in response to the second determination.

10. The non-transitory computer readable storage medium of claim 9, wherein the method executed by the processor further comprises executing the transport request in response to the second determination while the upgrade is being performed.

11. The non-transitory computer readable storage medium of claim 9, wherein the method executed by the processor further comprises importing transport requests in the import buffer to the another system after the upgrade has been completed.

12. The non-transitory computer readable storage medium of claim 9, wherein the first data object is an exchange table configured to store data dictionary objects.

13. The non-transitory computer readable storage medium of claim 9, wherein the database freeze trigger is generated with SQL Templates.

14. The non-transitory computer readable storage medium of claim 9, wherein while the upgrade is being performed:
  receiving from the tool or application a first request to modify the first database object
  receiving from the tool or application a second request to modify the second database object.

15. The non-transitory computer readable storage medium of claim 9, wherein the method executed by the processor further comprises executing the transport request stored in the import buffer once the upgrade is completed.

16. A computer implemented system, comprising:
  one or more computer processors; and
  a non-transitory computer-readable storage medium comprising instructions, that when executed, control the one or more computer processors to be configured for:
  initiating an upgrade of a system within a system landscape;
  generating a first database freeze trigger configured to prevent modification of a first data object within a database of the system in response to a first event occurring within the database while the upgrade is being performed and a second database freeze trigger configured to prevent modification of a second data object within the database of the system in response to a second event occurring within the database while the upgrade is being performed;

first determining a tool or application of the system that has been enabled to operate while the upgrade is being performed;

identifying the first database object as modifiable by the enabled tool or application; and deleting the first database freeze trigger corresponding to the first database object;

while the upgrade is being performed:
    allowing the tool or application to modify the first database object upon detecting the occurrence of the first event within the database, and
    executing the second database freeze trigger in order to prevent the tool or application to modify the second database object upon detecting the occurrence of the second event with the database;

receiving a transport request to transport content from the system to another system, the content having a transport object type;

second determining whether the transport object type is within a whitelist containing a plurality of transport object types that are transportable between the system and the another system while the upgrade is being performed;

blocking the execution of the transport request in response to the second determination; and storing the transport request in an import buffer of the another system in response to the second determination.

17. The computer implemented system of claim 16, wherein the instructions control the one or more computer processors to be further configured for executing the transport request in response to the second determination while the upgrade is being performed.

18. The computer implemented system of claim 16, wherein the instructions control the one or more computer processors to be further configured for importing transport requests in the import buffer to the another system after the upgrade has been completed.

19. The computer implemented system of claim 16, wherein while the upgrade is being performed:
    receiving from the tool or application a first request to modify the first database object
    receiving from the tool or application a second request to modify the second database object.

20. The computer implemented system of claim 16, wherein the instructions control the one or more computer processors to be further configured for executing the transport request stored in the import buffer once the upgrade is completed.

* * * * *